United States Patent
Zhang

(10) Patent No.: US 9,651,423 B1
(45) Date of Patent: May 16, 2017

(54) MEMS OPTICAL DEVICE COMPRISING A MEMS MAGNETIC SENSING MECHANSIM AND MEMS LIGHT ABSORBING STRUCTURE

(71) Applicant: Biao Zhang, Hinsdale, IL (US)

(72) Inventor: Biao Zhang, Hinsdale, IL (US)

( * ) Notice: Subject to any disclaimer, the term of this patent is extended or adjusted under 35 U.S.C. 154(b) by 0 days.

(21) Appl. No.: 15/206,297

(22) Filed: Jul. 10, 2016

(51) Int. Cl.
*G01J 3/42* (2006.01)
*G02B 5/122* (2006.01)

(52) U.S. Cl.
CPC ..................... *G01J 3/42* (2013.01)

(58) Field of Classification Search
CPC ......... G02B 5/122; H01L 27/15; H01L 33/00; G01J 3/42
See application file for complete search history.

(56) References Cited

U.S. PATENT DOCUMENTS

| | | | | |
|---|---|---|---|---|
| 7,484,857 | B2 * | 2/2009 | Bozler | G02B 5/122 250/342 |
| 8,818,007 | B2 * | 8/2014 | Robert | B06B 1/0292 181/142 |
| 2003/0015768 | A1 * | 1/2003 | Bosco | G02B 6/12004 257/528 |
| 2004/0021073 | A1 * | 2/2004 | Barbic | B01F 13/0059 250/298 |
| 2006/0249801 | A1 * | 11/2006 | Matsuo | B81B 7/0006 257/415 |
| 2016/0091378 | A1 * | 3/2016 | Tsai | H04R 19/005 73/728 |

* cited by examiner

*Primary Examiner* — David Porta
*Assistant Examiner* — Faye Boosalis

(57) ABSTRACT

A MEMS optical device and an array composed thereof are disclosed herein, wherein the MEMS optical device comprises a light absorbing element, a deforming element, and a magnetic detector, wherein the magnetic detector comprises a magnetic source and a magnetic sensor.

18 Claims, 4 Drawing Sheets

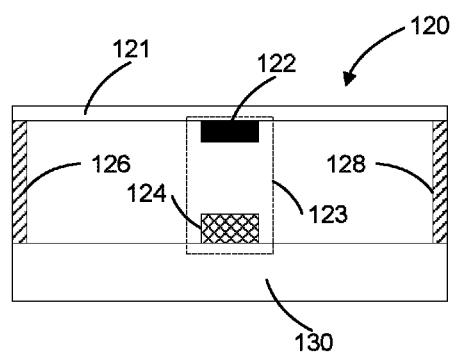
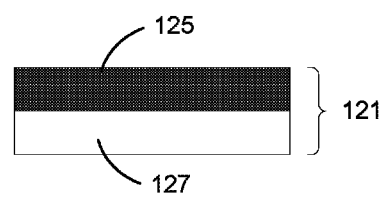
FIG. 5  FIG. 6a
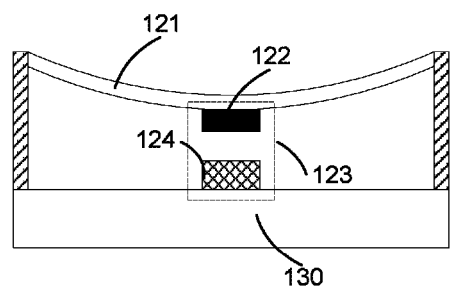
FIG. 6b
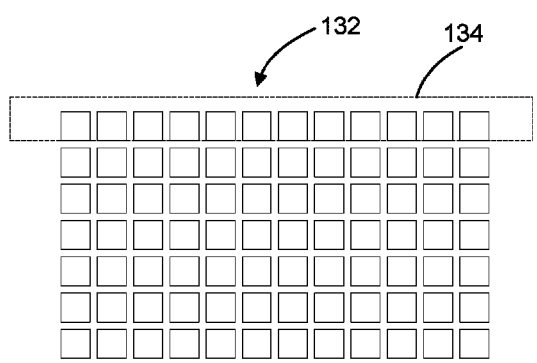
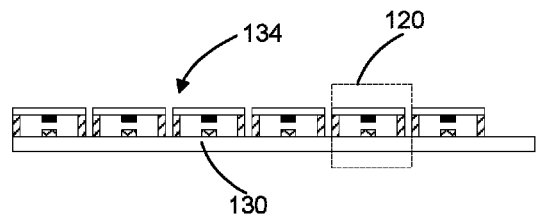
FIG. 7  FIG. 8

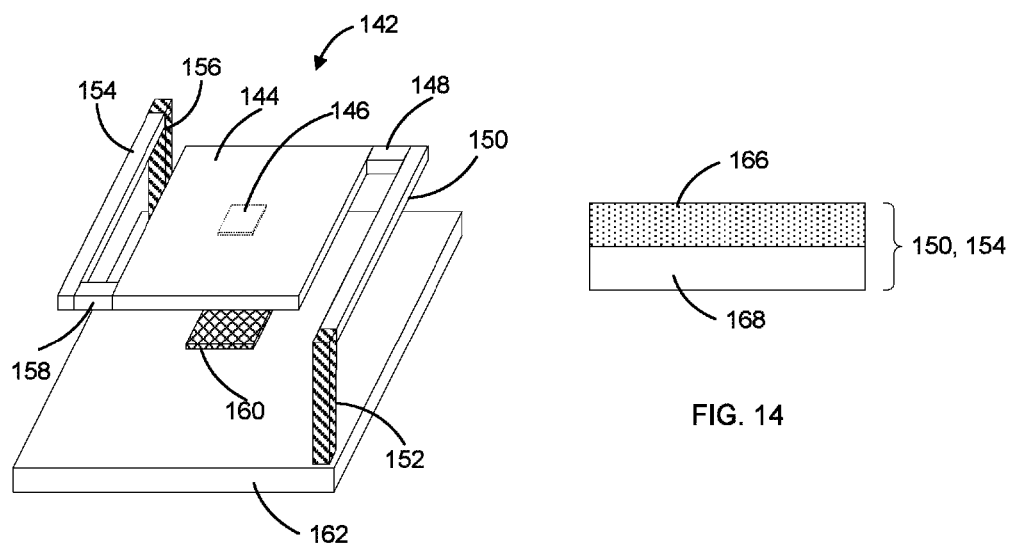
FIG. 13
FIG. 14
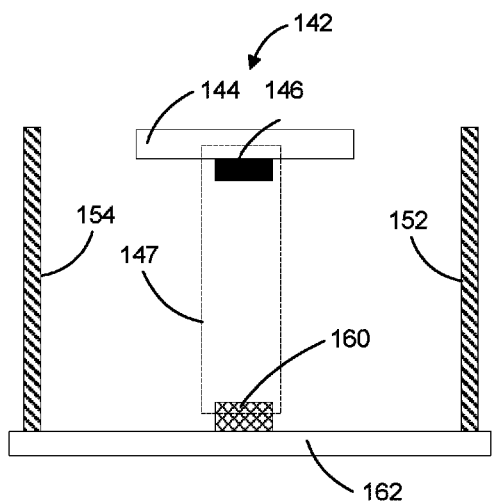
FIG. 15
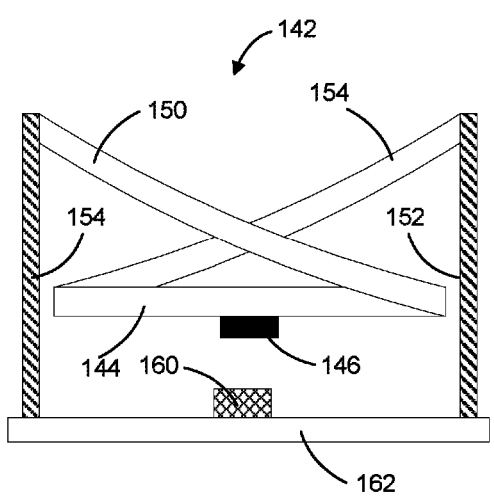
FIG. 16

MEMS OPTICAL DEVICE COMPRISING A MEMS MAGNETIC SENSING MECHANSIM AND MEMS LIGHT ABSORBING STRUCTURE

TECHNICAL FIELD OF THE DISCLOSURE

The technical field of the examples to be disclosed in the following sections is related generally to the art of MEMS (Micro-Electro-Mechanical-System) optical devices, and more particularly to MEMS FPAs (Focal-Plane-Arrays), and more particularly to MEMS Infrared and/or FPAs.

BACKGROUND OF THE DISCLOSURE

A group of MEMS optical devices is capable of absorbing incident light of a specific wavelength or a wavelength range, such as Infrared light sensors. A MEMS focal-plane-array (FPA) is an image sensing device consisting of an array of MEMS type of optical devices, which are often referred to as image pixels at the focal plane of a lens. MEMS FPAs are used commonly for imaging purposes but can also be used for non-imaging purposes such as spectrometry, lidar, and wavefront sensing.

Some of current MEMS optical devices use combination of heat plates and thermos-sensors. A typical example of an MEMS optical device is illustrated in FIG. 1. This MEMS optical device can be used as a non-cooled Infrared FPA pixel. Referring to FIG. 1, FPA pixel 100 comprises heat plate 102 and thermos-sensor 104. Heat plate 102 is composed of a material or a combination of materials, such as SiOx and SiNx, which have high absorption coefficient (e.g. higher than 60%), wherein the absorption coefficient is defined as "a measure of the rate of decrease in the intensity of incident light of a specific wavelength as the incident light passes through a given material; the fraction of incident light energy absorbed per unit mass or thickness of an absorber. Temperature of heat plate 102 is elevated after being exposed to the incident light of specific wavelength. Change of the temperature is quantitatively measured by thermos-sensor 104. Resistance of thermos-sensor 104 changes, e.g. in a linear way, with the changing of the temperature of heat plate 102.

Because thermos-sensor 104 measures the temperature of heat plate 102, thermos-sensor is often embedded, e.g. in physical contact with heat plate 102 to achieve accurate measurement. It is obviously to know that it is difficult to form a large FPA (e.g. FPA array 106 that is composed of pixel 100 as illustrated in FIG. 2) by using pixel 100 or pixels with a configuration similar to pixel 100, wherein temperature sensing mechanism (e.g. thermo-sensor 102) and light absorbing mechanism (e.g. heat plate 104) are physically contact to achieve accurate measurement. A reason is that when forming in to a large array, a large number of pixels are grouped. During each measurement, detecting current is driven through each thermos-sensor (e.g. thermos-sensor 104) to measure the voltage drop across the thermos-sensor. As a consequence, heat is unavoidably generated by the detecting current, and such unexpected heat dissipate into the heat-plate (e.g. heat-plate 102) and is mixed with the heat generated by the incident light. Measurement errors are caused thereby. Due to the physical configuration that the detecting mechanism (e.g. thermos-sensor 104) is physically embedded into the light absorbing mechanism (heat-plate 102), the error caused by the detecting current through the detecting mechanism (e.g. thermos-sensor 104) is intrinsic and unavoidable. FPAs using pixel of 100 as illustrated in FIG. 2 may not be a large array for the same reason as discussed above.

Another group of current MEMS optical devices capable of detecting incident light for imaging or non-image purposes use the same light absorbing mechanism as pixel 100 in FIG. 1, but different detecting mechanism, such as laser detection. A typical example of such MEMS optical device is illustrated in FIG. 3. Referring to FIG. 3, MEMS optical device 108 comprises deformable membrane 110 and optical antenna 112 that is attached to membrane 110. Antenna 112 can be disposed on the top surface of membrane 110, wherein the top surface is exposed to the incident light. Antenna 112 is capable of absorbing incident light of specific wavelength, such as Infrared light. Antenna 112 is configured according to the desired wavelength or wavelength ranges. In one example, antenna comprises multiple slits, as shown in FIG. 4. Referring to FIG. 4, antenna 112 on membrane 110 comprises a series of parallel elongated slits, such as slit 118. Each slit is composed of a specific material according to the desired wavelength of the incident light. For example, each slit is composed of gold. The geometry of each slit and the slit array are disposed such that the absorption of the desired incident of specific wavelength is maximized, such as higher than 60%.

The absorbed light by antenna 112 converts to heat energy and raises temperature of membrane 110, causing deformation of membrane 110 due to thermos-mechanical effect, as illustrated in dashed lines in FIG. 3. By quantitatively measuring the deformation of membrane 100, density of the incident light can be calculated.

A way to quantitatively measure the deformation of membrane 110 is to use optical interference effect. For example, a beam of laser 114 from laser source is directed to the membrane (e.g. the geometric center of membrane 110). Membrane 110 reflects laser 114; and the reflected laser 116 is collected by a detector. By comparing the reflected laser 116 with a reference laser beam using optical interference, displacement (i.e. deformation) of membrane 110 can be obtained.

The example discussed above with reference to FIG. 3 and FIG. 4 is difficult to form a large array. This is because that if formed into an array each pixel (structure 108 in FIG. 3) of the array is associated with an optical measuring mechanism as discussed above. Deformation of each pixel in the array can then be obtained so as to form an image frame. Providing an optical measuring mechanism for each pixel in FIG. 3 is obviously difficult.

Therefore, what is desired is an optical MEMS device, especially an optical device capable of forming a FPA.

SUMMARY OF THE DISCLOSURE

In view of the foregoing, a MEMS optical device is disclosed herein. The optical device comprises: a substrate; a deformable membrane capable of absorbing light, wherein the deformable membrane is held above the substrate such that the deformable membrane is capable of deforming above the substrate; and a magnetic sensing mechanism, comprising: a magnetic source capable of providing magnetic field, wherein the magnetic source is attached to the deformable membrane; and a magnetic sensor whose resistance is capable of changing according to the magnetic field provided by the magnetic source, wherein the magnetic sensor is disposed on the substrate.

In another example, a MEMS optical device is disclosed herein. The optical device comprises: a substrate; a heat plate capable of absorbing light of a wavelength; a first elongated deformable arm attached to the heat plate at one end, wherein the other end of the first elongated deformable arm is attached to a first post; a second elongated deformable arm attached to the heat plate at one end, wherein the other end of the second elongated deformable arm is attached to a second post, wherein said first and second posts are disposed on the substrate such that the heat plate is held above the substrate by the first and second deformable arms and first and second posts; and a magnetic sensing mechanism, comprising: a magnetic source capable of providing magnetic field, wherein the magnetic source is attached to the heat plate; and a magnetic sensor whose resistance is capable of changing according to the magnetic field provided by the magnetic source, wherein the magnetic sensor is disposed on the substrate.

BRIEF DESCRIPTION OF DRAWINGS

FIG. 5 illustrates a side view of an exemplary MEMS optical device of this invention, wherein the MEMS optical device comprises a mechanically deformable membrane and a detection mechanism that is capable of detecting the deformation of the membrane, wherein the detection mechanism comprises a magnetic field source and magnetic sensor that measures the magnetic field of the magnetic source;

FIG. 6a illustrates an example of the deformable membrane in the device illustrated in FIG. 5, wherein the deformable membrane comprises multiple layers for enhanced absorption of the incident light of interest;

FIG. 6b illustrates a state of the MEMS optical device in FIG. 6 in an operation, wherein the mechanically deformable membrane of the optical device is deformed due to the absorption of the incident light;

FIG. 7 illustrates a FPA composed of the MEMS optical device of FIG. 5 and FIG. 6;

FIG. 8 illustrates a size view of a row of the FPA of FIG. 7;

FIG. 13 illustrates another example of MEMS optical device of this invention, wherein the MEMS optical device comprises a heat plate for absorbing incident light, a deformable arm structure attached to the heat plate; and a detection structure for detecting the deformation of the deformable arm structure;

FIG. 14 illustrates an exemplary bi-morph of the deformable arms in FIG. 13;

FIG. 15 is a cross-sectional view of the MEMS optical device of FIG. 13 in a non-deformable state; and FIG. 16 illustrates a state of the MEMS optical device in FIG. 14 in an operation wherein the optical device is exposed to incident light causing the deformable arm structure deforming.

DETAILED DESCRIPTION OF SELECTED EXAMPLES

Figure 1:
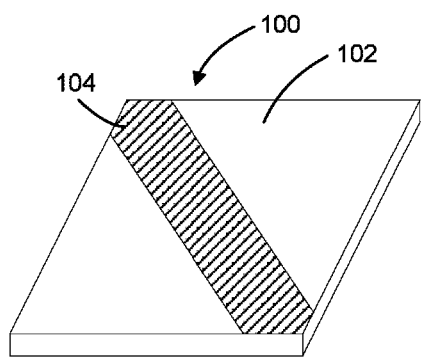
FIG. 1 diagrammatically illustrates a typical MEMS optical device comprising a light absorbing mechanism and detecting mechanism in prior art.
Figure 2:
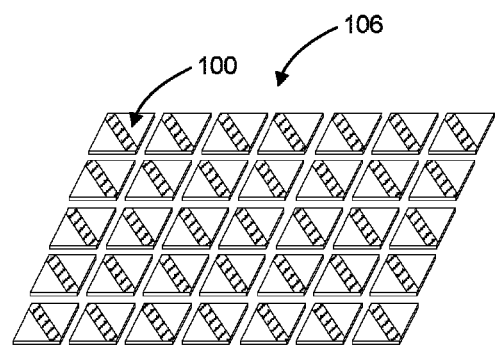
FIG. 2 illustrates a FPA of the optical device illustrated in FIG. 1.
Figure 3:
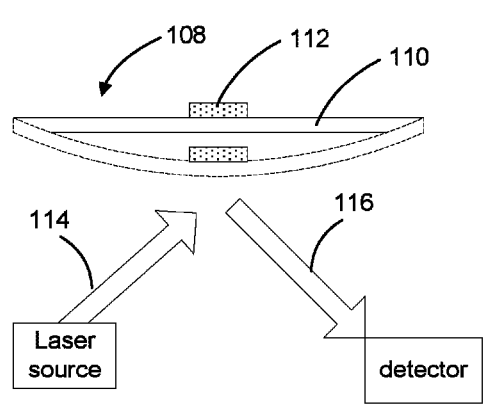
FIG. 3 illustrates another exemplary MEMS optical device comprising a light absorbing mechanism, a mechanically deformable mechanism, and a detecting mechanism for detecting the deformation in prior art.
Figure 4:
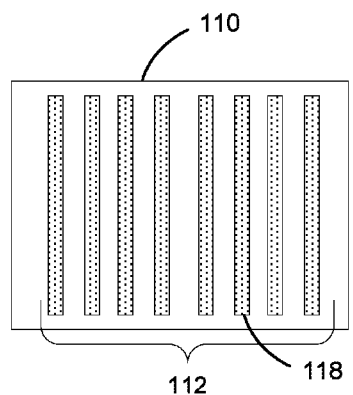
FIG. 4 illustrates a top view of an example of the light absorbing mechanism in the MEMS optical device in FIG. 3.

Disclosed herein comprises a MEMS optical device capable of responding to incident light of specific wavelength or wavelength range. From the response, detection of the incident light can be achieved. The detection can be applied to imaging and non-imaging applications such as spectrometry, lidar, and wavefront sensing and many other applications. The MEMS optical device can be particularly useful in forming a large FPA array, such as FPA of VGA and above.

In one example of this MEMS optical device of this invention, the detection mechanism comprises a magnetic source and magnetic sensor, wherein the magnetic sensor is spaced apart from the light absorbing mechanism. An advantage of this configuration is that the heat generated by the sensing current flowing through the magnetic sensor can be isolated from the heat generated by the light absorbing mechanism, and thus significantly increases the measurement accuracy.

In another example of this invention, the MEMS optical device is used to form a FPA, wherein each FPA pixel comprises a light absorbing mechanism and a detection mechanism that is associated with said light absorbing mechanism in the FPA.

In the following, the invention will be disclosed with referring to selected examples. It will be appreciated by those skilled in the art that the following discussion including the selected examples are for demonstration purpose only, and should not be interpreted into any limitation.

Referring to FIG. 5, an example of a MEMS optical device of this invention is illustrated therein. In this example, MEMS optical device 120 comprises mechanically deformable membrane 121 that is supported by posts 126 and 128 on substrate 130. Detection mechanism 123 is disposed between deformable membrane 121 and substrate 130 for detecting the deformation of deformable membrane 121. Detection mechanism 123 comprises magnetic source 122 for generating magnetic field and magnetic sensor 124 capable of sensing the magnetic field and magnetic field gradient of the magnetic field generated by magnetic source 122. Magnetic source 122 in this example is disposed on the bottom surface of deformable membrane 121. Magnetic sensor 124 is disposed on substrate 130 such that magnetic sensor 124 is spaced apart from deformable membrane 121 and magnetic source 122.

Deformable membrane 121 is provided for absorbing incident light of specific wavelength or wavelength range, such as Infrared light or Terahertz (THz) light. For this purpose, deformable membrane 121 may comprises a material such as SiOx and SiNx and many other suitable materials. Alternatively, deformable membrane 121 may be a laminate comprising multiple layers of different materials, an example of which is illustrated in FIG. 6a.

Referring to FIG. 6a, deformable membrane 121 comprises layer 125 and layer 127, wherein layers 125 and 127 comprise different materials. For example, layer 125 may comprise a material that has high absorption coefficient, such as higher than 60%, 80%, 90%, to the incident of interest. The material for layer 127 may or may not be required to have a high absorption coefficient.

Layers 125 and 127 are preferred to have a large difference in their CTE (Coefficient of Thermo-Expansion). For example, the relative difference in CTE of layers 125 and 127 can be 1% or higher, 5% or higher, 100% or higher, 20% or higher, 30% or higher, 50% or higher, wherein the relative difference of CTE in percentage is defined as: ABS ((CTE of layer 125-CTE of layer 127))/MAX (CTE of layers 125 and 127). In the above expression, ABS( ) is the absolute value; MAX( ) is the maximum value. Larger difference in CTE of layers 125 and 127 enhances mechanical deformation of layer 121 (the combination of layers 125 and 127) due to thermos-mechanical effect. Larger mechanical deformation obviously makes detection of the mechanical deformation much easier, which will be discussed in the following.

In one example, layer 125 may comprise a metal material, especially when the incident light of interest is in the visible, Infrared, or Terahertz (THz). The metal can be Gold (Au) or Aluminum (Al). Layer 127 can be composed of a ceramic material, wherein a ceramic material can be silicon-oxides (e.g. SiOx), silicon-nitrides (SiNx).

Laminate layer 121, in addition to layers 125 and 127 as discussed above, may comprise other materials for different purposes, such as Ta between layers 125 and 127 for enhancing the bonding of layers 125 and 127.

The geometry of deformable membrane (layer 121) is configured to be compatible with the incident light of interest. For example wherein deformable membrane 121 is a single layer, the thickness of deformable membrane 121 is selected such that the interference between the reflected light from the upper surface (exposed to the incident light) of deformable membrane 121 and the reflected light from the bottom surface (opposite to the incident light) of deformable membrane 121 is destructive. Such destructive interference causes absorption of the incident light of interest at deformable membrane 121. In an example wherein deformable membrane 121 is a laminate comprising multiple layers such as that illustrated in FIG. 6a, it is preferred that the top layer of the laminate, which is layer 125 has a thickness such that the interference of the reflected light from the top surface of layer 125 and the reflected light from the bottom surface of layer 125 is substantially constructive. The same constructive interference may also be expected in layer 127, though not required.

When exposed to the incident light of interest, deformable membrane 121 absorbs the incident light. The energy of the absorbed light raises the temperature of layer 121, causing the temperature change of deformable membrane 121. The temperature change consequently causes the mechanical deformation of deformable membrane 121 due to thermos-mechanical effect, which is illustrated in FIG. 6b. The mechanical deformation can be significantly increased when deformable membrane 121 is a laminate comprising multiple layers of different CTEs as discussed above with reference to FIG. 6a. In this example, layer 125 absorbs incident light. The energy of the absorbed incident light is converted into thermos-energy that causes the temperature changes in both of layers 125 and 127. Due to the different CTEs of layers 125 and 127, deformable membrane 121 (comprising layers 125 and 127) shows large thermos-mechanical deformation.

Deformation of deformable membrane 121 can be proportional to the amount of heat generated by the absorbed light; and the amount of heat generated by the absorbed light can be proportional to the intensity of the absorbed light. In a simple approximation, deformation that can be measured by the linear displacement of the geometrical center of deformable membrane 121 is proportional to the intensity of the absorbed incident light, wherein the linear displacement is along the normal direction of the plane of deformable membrane 121. By quantitatively measuring the displacement of deformable membrane 121, the intensity of the incident light can be obtained.

In order to measure the displacement of deformable membrane 121, detection mechanism 123 is provided, as illustrated in FIG. 5. Detection mechanism 123 is a remote sensing mechanism wherein the sensor and the object to be sensed or measured are not physically connected or attached. In this example, detection mechanism 123 is based upon magnetic field sensing technique. Specifically, detection mechanism 123 comprises magnetic source 122 and magnetic sensor 124. Magnetic sensor 122 is attached to the bottom surface of deformable membrane 121 such that magnetic sensor 122 moves with the deforming membrane 121. Magnetic source 122 provides magnetic field. Magnetic sensor 124 is attached to the top surface of substrate 130 and at a location in the vicinity of magnetic source 122. It is preferred, though not required that magnetic sensor 124 is disposed at a location wherein the magnetic field gradient generated by magnetic source 122 is primarily maximized.

When deformable membrane 121 is deformed due to exposure to the incident light of interest, magnetic source 122 moves with the deforming membrane 121, resulting in a change of the distance between magnetic source 122 and magnetic sensor 124. This distance change causes the change of the magnetic field at the location of magnetic sensor 124, wherein the change of the magnetic field comprises changes of both of the direction and strength components of the magnetic field. By measuring the change in the strength component, the change in distance between magnetic source 122 and magnetic sensor 124 can be obtained. The obtained change in distance can be used to calculate the deformation of deformable membrane 121. As discussed above, the deformation can be proportional to the intensity of the absorbed incident light. From the obtained deformation of deformable membrane 121, intensity of the absorbed incident light can be calculated.

The magnetic source (122) can be composed of any suitable magnetic materials such as hard magnetic materials or soft magnetic materials. In examples wherein magnetic source 122 is composed of a hard magnetic material such as permanent magnet, magnetic source 122 continuously generates magnetic field. In examples wherein magnetic source 122 is composed of a soft magnetic material such as NiFe, external magnetic field maybe needed to magnetize the magnetic source. In the presence of the external magnetic field, magnetic source composed of a soft magnetic material is magnetized. The magnetized magnetic source 122 generates magnetic field that is used to quantitatively measure the deformation of deformable membrane 121. When the external magnetic field is withdrawn, magnetic source 122 may not generate magnetic field. Deformation of deformable membrane 121 may not be achieved.

In some applications, using a soft magnetic material for magnetic source may be preferred because such configuration can be of advantageous in measuring the deformation of deformable membrane in a more controlled way. When measuring the deformation of deformable membrane 121 is not expected such as during calibration or other applications, external magnetic field can be removed at any time.

The external magnetic field can be generated in many ways. For example, a permanent magnetic field can be provided across the entire optical structure 120, or across the entire FPA composed of an array of optical device 120. Alternatively, a wire can be provided in the vicinity of magnetic source that is composed of a soft magnetic material. For example, a wire can be disposed on substrate 130 in the vicinity of magnetic sensor 124. During operation, a substantially constant current is driven through the wire so as to generate an excitation magnetic field. The soft material of magnetic source 122 can be magnetized with such excitation magnetic field. In this instance, the magnetic field at the location of magnetic senor 124 is a combination of the excitation magnetic field and magnetic field generated by magnetic source 122. Because the excitation magnetic field is static and known from the constant current flowing through the wire, the instant magnetic field generated by magnetic source 122 can be calculated.

Magnetic sensor 124 can be any suitable sensors capable of measuring magnetic field. However, it is expected that magnetic sensor 124 is a MEMS sensor and can be integrated with the other MEMS components such as deformable membrane 121 and magnetic source 122. It is further expected that magnetic sensor 124 has sufficient sensibility and accuracy in measuring the deformation of deformable membrane 121. This is because the deformation of deformable membrane 121 can be small. For example, the displacement of the geometric center of deformable membrane 121 can be in the order of several angstroms, several to ten of nanometers. In order to accurately measure such small displacement, magnetic sensor 124 is expected to have high accuracy and sensitivity, in addition to the MEMS expectation. A group of good candidates of magnetic sensor 124 is MR (magnetic sensors), such as AMR (anisotropic Magneto-Resistance), GMR (Giant Magneto-Resistance) that is also referred to as Spin-Valve, and TMR (Tunnel-Magneto-Resistance) that is also referred to as MTJ (Magnetic Tunnel Junction). Other types of magnetic sensors, such as MEMS flux-gates are also applicable. Because there are many disclosures of MR (Magnetic Sensors) including AMR, GMR, and TMR in the art, these MR will not be discussed in herein for simplicity.

For measuring the magnetic field generated by magnetic source 122, a constant sensing current is driven through magnetic sensor 124 during operation, for example, through a control circuit that can be disposed in substrate 130, which is not shown in the figure for simplicity. By measuring the voltage drop across magnetic sensor 124, instant value of the resistance of magnetic sensor 124 can be obtained given that the sensing current flowing through magnetic sensor 124 is substantially constant. Because the instant resistance of magnetic sensor 124 is substantially proportional to the instant magnetic field at the location of magnetic sensor 124, the instant magnetic field can be obtained. The instant magnetic field is a known function of the distance between magnetic source 122 and magnetic field 124. The instant distance, and thus the deformation of deformable membrane 121, can thus be calculated based upon the known function and the obtained instant magnetic field.

In the example discussed above with reference to FIG. 5, FIG. 6a, and FIG. 6b, magnetic sensor 124 is disposed on substrate 130; and magnetic source 122 is attached to deformable membrane 121. In an alternative example, magnetic sensor 124 can be attached to deformable membrane 121; and magnetic source 122 can be disposed on substrate 130, which is not shown for simplicity.

Because magnetic sensor 124 and magnetic source 122 (and thus deformable membrane 121) are physically isolated and untouched, heat generated by the current flowing through magnetic sensor 124 can be significantly isolated from heat generated by the absorption of deformable membrane 121. This feature can be of great importance in forming a large array, such as a FPA as illustrated in FIG. 7. Referring to FIG. 7, a 7×12 array composed of optical device shown in FIG. 5 is illustrated for demonstration. It will be appreciated by though skilled in the art that the 7×12 in FIG. 7 is for demonstration purpose, and should not be interpreted as a limitation. FPA 132 composed of optical device of FIG. 5 may have any desired resolutions, such as 640×480, 800×600, 1024×768, and other resolutions. It is noted that each pixel of FPA 132 comprises a detection mechanism associated with the MEMS deformable membrane of the pixel, which is better illustrated in a side view of row 134 of FPA 132 in FIG. 8. Referring to FIG. 8, row 134 comprises a series of pixels that are MEMS optical devices such as MEMS optical device 120 as discussed above with reference to FIG. 5. The pixels of row 134 share a common substrate, such as substrate 130. Each pixel has an independent detection mechanism and deformable membrane as shown in FIG. 5. It is further noted that substrate 130 may comprise an electrical circuit for reading the outputs of the magnetic sensors of the row (and the FPA). Reading the magnetic sensors in the FPA can be achieved by row decoder and line decoder, which will not be detailed herein.

As discussed above with reference to FIG. 6a, deformable membrane 121 can be a laminate composed of multiple layers of different optical and/or mechanical properties. In one example, top layer 125 as illustrated in FIG. 6a can be configured into multiple slits to enhance the optical absorption as illustrated in FIG. 9 and FIG. 10.

Figure 9:
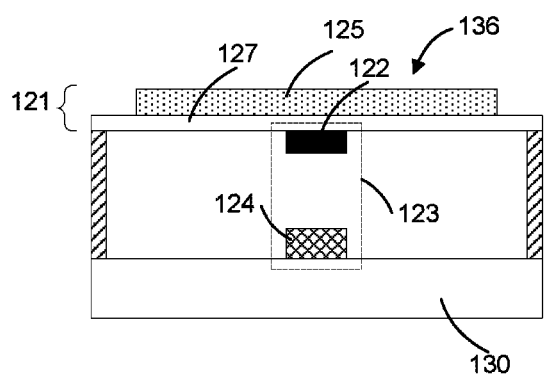
FIG. 9 illustrates a variation of the MEMS optical device in FIG. 5 by adding an antenna on the top surface of the membrane of the device in FIG. 5, wherein the antenna is capable of enhancing the absorption of incident light of specific wavelength.
Figure 10:
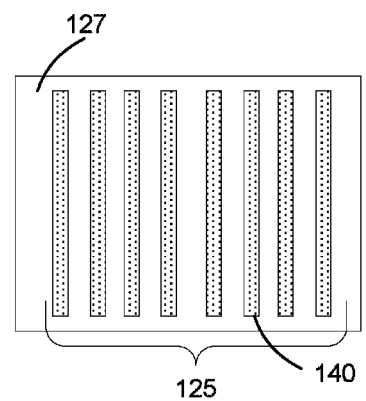
FIG. 10 illustrates an example of the antenna of the optical device in FIG. 9.

Referring to FIG. 9, MEMS optical device 136 comprises deformable membrane 127 that is supported above substrate 130 by posts such that deformable membrane 127 is capable of deforming above substrate 130. Detection mechanism 123 comprising magnetic source 122 and magnetic sensor 124 are disposed between deformable membrane 127 and substrate 130. Substrate 130, which may comprise circuits, is provided, on which other components of the device can be formed. Deformable membrane 127, detection mechanism 123 and magnetic source 122 and magnetic sensor 124 thereof, and substrate 130 can be the same as those discussed above with reference to FIG. 5.

Absorption layer 125 is disposed on the top surface of deformable membrane 127. In this example, absorption layer 125 is configured into multiple slits as illustrated in FIG. 10. Referring to FIG. 10, absorption layer 125 comprises multiple slits such as slit 140 on deformable membrane 127. The slits are configured such that the absorption of the incident light of specific wavelength or wavelength is maximized. In one example, the slits absorbed the incident light based upon the resonance of surface plasmon. The slits of absorption layer 125 may have substantially the geometry (e.g. length, width, and thickness). The pitch of the slits, which is defined as the center-to-center distance between adjacent slits, may or may not be the same. The slits may have different dimensions. For example, the slits may have different width (the dimension of the slit along the direction perpendicular to the length of the slit) but substantially the same thickness and length. Such non-uniform width configuration can be important especially when incident light of multiple wavelengths or a range of wavelength are desired to be absorbed. In instance of non-uniform width slits being used, the slits may or may not have the same pitch (i.e. the center-to-center distance between adjacent slits in the slit array).

Figure 11:
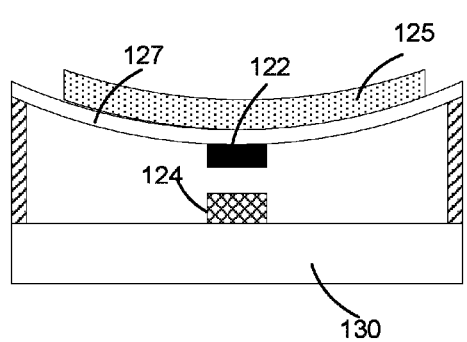
FIG. 11 illustrates a state of the optical device in FIG. 9 in an operation wherein the membrane is mechanically deformed due to the absorption of the incident light.

When exposed to incident light of interest, absorbing layer absorbs the incident light of interest and generates heat. Due to the different CTE (Coefficient of Thermo-Expansion) of absorbing layer 125 and deformable membrane 127, deformable layer 127, as well as absorbing layer 125 deforms, as illustrated in FIG. 11. Similar to that discussed above with reference to FIG. 5 and FIG. 6b, the deformation can be proportional to the intensity of absorbed light. As deformable membrane 127 deforms, magnetic source 122 moves with deformable membrane 127 such that the relative distance between magnetic source 122 and magnetic sensor 124 changes. The magnetic field generated by magnetic source 122 at the location of magnetic sensor 124 changes. The magnetic resistance of magnetic sensor 124 changes accordingly. By analyzing the change of the magnetic resistance of magnetic sensor 124, the distance change between magnetic source 122 and magnetic sensor 124 can be calculated, from which, intensity of absorbed incident light can be obtained.

Figure 12:
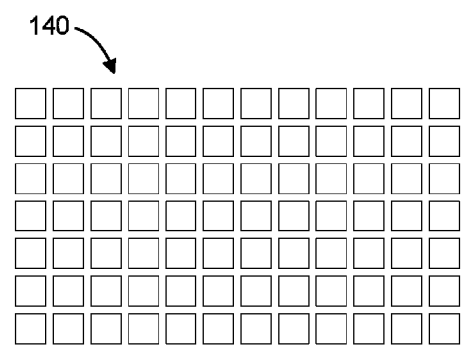
FIG. 12 illustrates a FPA composed of the optical device of FIG. 9.

For the same or similar reason that the magnetic sensor is spaced apart from the deformable membrane 127 and/or absorption layer 125 as discussed above with reference to FIG. 5 and FIG. 6b, MEMS optical device 136 as illustrated in FIG. 9, FIG. 10, and FIG. 11 can be used to form an array, such as FPA. FIG. 12 illustrates an example of a FPA composed of MEMS optical device of FIG. 9. FPA 140 in FIG. 12 is a 7×12 array for demonstration. It will be appreciated by though skilled in the art that the 7×12 in FIG. 12 is for demonstration purpose, and should not be interpreted as a limitation. FPA 140 may have any desired resolutions, such as 640×480, 800×600, 1024 768, and other resolutions.

In examples illustrated in FIG. 5 and FIG. 9, light absorbing elements (e.g. 125 in FIG. 9) and deformable element (e.g. 127 in FIG. 9) are laminated. For example in FIG. 9, a major surface of absorbing layer 125 (the bottom surface) is directly positioned on a major surface (the top surface) of deformable layer 127. In an alternative example, light absorbing element and deformable element can be separated, an example which is illustrated in FIG. 13.

Referring to FIG. 13, MEMS optical device 142 and upper wafer and lower wafer. The upper wafer comprises heat plate 144, deformable arms 150 and 154 that are connected to heat plate 144 through connectors 148 and 158. Deformable arms 150 and 154 are connected to posts 152 and 156. Magnetic source 146 (shown as dashed lines) is disposed at the bottom surface of heat plate 144, which is better illustrated in the side sectional view in FIG. 15. Referring to FIG. 15, magnetic source 146 is attached to the bottom surface of heat plate 144; and magnetic sensor 160 is disposed at the top surface of substrate 162. Heat plate 144 is capable of moving towards or away from substrate 162 because of the deformation of deformable arms that are not shown in FIG. 15.

Referring again to FIG. 13, the lower substrate comprises substrate 162 and magnetic sensor 160 that is disposed on substrate 162. The upper substrate and bottom substrate are connected through posts 152 and 156. Specifically, deformable arms 150 and 154 are connected to posts 152 and 156 at one ends such that the ends of the deformable arms connected to the posts are substantially non-movable. It is preferred that the ends of the deformable arms connecting to the posts 152 and 156 have a substantially constant temperature, wherein the constant temperature is substantially the temperature of substrate 162. This temperature preference can be of great importance in obtaining a linear response of the deformation of deformable arms to the temperature (and thus the intensity of the absorbed light by heat plate 144) of heat plate 144 that is connected to the other ends of deformable arms.

Referring again to FIG. 13, heat plate 144 is designated for absorbing incident light of interest. Heat plate 144 can be a single layer or a laminate comprising multiple layers of different optical and/or mechanical properties, as layers 121 discussed above with reference to FIG. 5, FIG. 6a, FIG. 9, and FIG. 10.

Deformable arms 150 and 154 each can be a bi-morph as illustrated in FIG. 14. Referring to FIG. 14, deformable arms 150 and 154 each may comprise top layer 166 and bottom layer 168, wherein top layer 166 and bottom layer 168 have different CTEs (Coefficient of Thermo-Expansion). Top layer 166 may have a larger CTE than bottom layer 168. In this instance, bi-morph 150 and 154 deform "downwards" when heated. In examples wherein top layer 166 has a smaller CTE than bottom layer, bi-morph 150 and 154 deform "upwards."

With this configuration, heat plate 144 can move towards or away from substrate 162 when deformable arms 150 and 154 deform, which is better illustrated in FIG. 16. Referring to FIG. 16, the deformable arms 150 and 156 are configured into moving downwards when heated up. This is achieved by the top layer 166 as shown in FIG. 14 having a higher CTE than bottom layer 168 as shown in FIG. 14. The distance between magnetic source 146 and magnetic sensor 160 changes according to the amount of deformation of deformable arms.

Referring back to FIG. 13, heat plate 144 absorbs incident light of interest. The absorbed light is converted into heat and the heat is transferred to deformable arms 150 and 154 through connectors 148 and 158. Upon heated, deformable arms deform "downwards" or "upwards." Because one ends of deformable arms 150 and 154 are fixed to posts 152 and 156, the other ends connecting to heat plate 144 move towards or away from substrate 162, resulting in the movement of heat plate 144 moving "towards" or "away from" substrate 162. Because magnetic source 146 is attached to the bottom surface of heat plate 144; and magnetic sensor 160 is positioned on the top surface of substrate 162, the distance between magnetic source 146 and magnetic sensor 160 changes with the moving heat plate 144. Such distance change causes the magnetic field change at the location of magnetic sensor on substrate 162. The magnetic field change consequently causes change of the magnetic resistance of magnetic sensor 160. By measuring the resistance change of magnetic sensor 160, the deformation of the deformable arms 150 and 154 can be calculated. From the calculated deformation, the intensity of the light absorbed by heat plate 144 can be obtained.

MEMS optical device 142 can be used to form an array, such as FPA. The FPA may have any desired resolutions, such as 640×480, 800×600, 1024×768, and other resolutions.

The MEMS optical devices as discussed above with reference to FIG. 5 through FIG. 16 each can be packaged at a lower pressure than the atmosphere. This vacuumed packaging can be of great importance in obtaining a higher Q factor, such 200 or higher, 500 or higher, 1000 or higher, 2000 or higher, 5000 or higher, 10,000 or higher. Moreover, the vacuumed packaging can significantly reduce the transfer of the heat generated by the current flowing through magnetic sensors to heat plate 144, which in turn increases measurement accuracy.

It will be appreciated by those of skilled in the art that a new and useful MEMS optical device and an array composed thereof have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof. In the claims, only elements denoted by the words "means for" are intended to be interpreted as means plus function claims under 35 U.S.C. §112, the sixth paragraph.

I claim:

1. A MEMS optical device, comprising:
   a substrate;
   a deformable membrane capable of absorbing light, wherein the deformable membrane is held above the substrate such that the deformable membrane is capable of deforming above the substrate, wherein the deformable membrane comprises a top layer and a bottom layer, and wherein the top layer and bottom layer have different CTEs; and
   a magnetic sensing mechanism, comprising:
      a magnetic source capable of providing magnetic field, wherein the magnetic source is attached to the deformable membrane; and
      a magnetic sensor whose resistance is capable of changing according to the magnetic field provided by the magnetic source, wherein the magnetic sensor is disposed on the substrate.

2. The device of claim 1, wherein the top layer is composed of a metallic material.

3. The device of claim 2, wherein the bottom layer is composed of a ceramic material.

4. The device of claim 3, wherein the deformable membrane comprises a laminate of a gold layer and a SiNx layer.

5. The device of claim 3, wherein the deformable membrane comprises a laminate of a Al layer and a SiNx layer.

6. The device of claim 3, wherein the deformable membrane comprises a laminate of a gold layer and a SiOx layer.

7. The device of claim 3, wherein the deformable membrane comprises a laminate of a Al layer and a SiOx layer.

8. The device of claim 1, wherein the magnetic source is a permanent magnet.

9. The device of claim 1, wherein the magnetic source is a soft magnet; and wherein the magnetic detector further comprises a magnetic field generator capable of generating an external magnetic field to magnetize the soft magnet.

10. The device of claim 9, wherein the magnetic field generator comprises a wire such that current flowing through the wire generates magnetic field to magnetize the soft magnet.

11. The device of claim 1, wherein the magnetic sensor comprises a magnetic-resistor.

12. The device of claim 11, wherein the magnetic resistor is an AMR (Anisotropic Magneto-resistance).

13. The device of claim 11, wherein the magnetic resistor is a GMR (Spin Valve).

14. The device of claim 11, wherein the magnetic resistor is a MTJ (Magnetic Tunnel Junction).

15. A MEMS optical device, comprising:
   a substrate;
   a heat plate capable of absorbing light of a wavelength;
   a first elongated deformable arm attached to the heat plate at one end, wherein the other end of the first elongated deformable arm is attached to a first post;
   a second elongated deformable arm attached to the heat plate at one end, wherein the other end of the second elongated deformable arm is attached to a second post, wherein said first and second posts are disposed on the substrate such that the heat plate is held above the substrate by the first and second deformable arms and first and second posts;
   a magnetic sensing mechanism, comprising:
      a magnetic source capable of providing magnetic field, wherein the magnetic source is attached to the heat plate; and
      a magnetic sensor whose resistance is capable of changing according to the magnetic field provided by the magnetic source, wherein the magnetic sensor is disposed on the substrate and
   wherein the first and second deformable arms each comprise a top layer and a bottom layer, and wherein the top layer and bottom layer have different CTEs.

16. The device of claim 15, wherein the top layer is composed of a metallic material.

17. The device of claim 16, wherein the bottom layer is composed of a ceramic material.

18. The device of claim 15, wherein the magnetic sensor comprises a magnetic-resistor.

* * * * *